UNITED STATES PATENT OFFICE.

OTTO FRANK AND OSKAR FINCKE, OF BERLIN, GERMANY.

PROCESS OF MAKING NITROGEN COMPOUNDS.

1,101,424.  Specification of Letters Patent.  Patented June 23, 1914.

No Drawing.  Application filed February 10, 1912.  Serial No. 676,844.

*To all whom it may concern:*

Be it known that we, OTTO FRANK and OSKAR FINCKE, both subjects of the German Emperor, and residents of Berlin, Germany, have invented certain new and useful Improvements in Processes of Making Nitrogen Compounds, of which the following is a specification.

This invention relates to a process for manufacturing a fertilizing agent with the aid of the nitrogen of the air which process is characterized in that the nitrogen of the air, after the previous removal of the oxygen, is introduced into a heated mixture of one or more bases and a plurality of metals, and combines therewith to produce nitrogen compounds.

Now it has been found that, when nitrogen is caused to act upon bases and metals and when only one base and one metal are employed, the absorption of the nitrogen takes place only in a limited quantity or not at all, the reason being perhaps that in such cases the material under treatment melts easily, while, when one or more bases and a plurality of metals are employed well mixed together, a very energetic absorption takes place and the mass does not melt but remains in the state of powder. As readily seen it is thus possible to accelerate the formation of nitrid by making use of a mixture of bases and metals because in this manner the melting of the mass is prevented. Mixtures which are suitable for this purpose are the following:—silicon, iron and lime; or silicon, iron and barium oxid; or iron, silicon, magnesia and lime; although other similar mixtures may be employed if desired. A particularly favorable mixture for use in carrying out this process may consist of 1 part by weight of iron, 5 parts by weight of freshly calcined dolomitic limestone, and ¼ part by weight of amorphous silicon. In place of the silicon, an equal weight of amorphous boron may be employed. For further illustrating my process the following example is given, in which the parts are given by weight: 3 parts of silicon, 2 parts of iron, and 8 parts of lime are heated to 700° C., and a current of nitrogen is passed into contact therewith, while said mixture is being heated to 1000° C., a mixture including $Ca_2FeN_4$ and $Ca_2Si_3FeN_4$ is produced. In this example a suitable amount of reducing agent obviously should be employed, to combine with the oxygen content of the lime. In this example a part of the lime may be replaced by other alkaline earth metal oxid, such as magnesium oxid, or in place of pure lime, dolomitic lime may be employed.

As readily seen, the nitrogen compounds of calcium and iron, or calcium, silicon and iron, or calcium and silicon are obtained. These are powder-like materials which are not hygroscopic, do not produce dust, have no poisonous effects, either on plants or animals, and which yield their nitrogen gradually to the soil, and consequently are valuable for use as fertilizers.

In the appended claims, the term "metal" is intended to cover, together with such substances as are ordinarily referred to as metals, such substances as silicon and boron, which are capable of forming stable nitrids, which closely resemble nitrids of metals such as iron and aluminum. The expression "mixture of metals" likewise includes mixtures containing silicon, boron and the like.

What we claim is:—

1. A process of producing nitrogen compounds which comprises treating a mixture including a plurality of nitrid-forming metals in elementary form, and an oxid of an alkaline earth metal with nitrogen gas, at a temperature of at least 700° C., in the presence of a reducing agent.

2. A process of producing nitrogen compounds which comprises treating a mixture including elementary silicon and iron and dolomitic lime, with nitrogen gas at a temperature between 700° C. and a white heat, in the presence of a reducing agent.

In testimony whereof we have hereunto set our hands in presence of two witnesses.

OTTO FRANK.
OSKAR FINCKE.

Witnesses:
HENRY HASPER,
WOLDEMAR HAUPT.